US012502658B2

(12) United States Patent
Doerfelt et al.

(10) Patent No.: US 12,502,658 B2
(45) Date of Patent: Dec. 23, 2025

(54) CHROMIUM-FREE HYDROGENATION CATALYST HAVING INCREASED WATER AND ACID STABILITY

(71) Applicant: CLARIANT INTERNATIONAL LTD, Muttenz (CH)

(72) Inventors: Christoph Doerfelt, Munich (DE); Manuel Pfanzelt, Sauerlach (DE); Goetz Burgfels, Bad Aibling (DE); Frank Grossmann, Munich (DE)

(73) Assignee: CLARIANT INTERNATIONAL LTD, Muttenz (CH)

( * ) Notice: Subject to any disclaimer, the term of this patent is extended or adjusted under 35 U.S.C. 154(b) by 675 days.

(21) Appl. No.: 17/908,027

(22) PCT Filed: Mar. 9, 2021

(86) PCT No.: PCT/EP2021/055910
§ 371 (c)(1),
(2) Date: Aug. 30, 2022

(87) PCT Pub. No.: WO2021/180717
PCT Pub. Date: Sep. 16, 2021

(65) Prior Publication Data
US 2023/0083112 A1    Mar. 16, 2023

(30) Foreign Application Priority Data

Mar. 13, 2020 (DE) ..................... 10 2020 106 964.2

(51) Int. Cl.
| | | |
|---|---|---|
| *B01J 23/72* | (2006.01) | |
| *B01J 23/00* | (2006.01) | |
| *B01J 35/30* | (2024.01) | |
| *B01J 35/37* | (2024.01) | |
| *B01J 35/40* | (2024.01) | |
| *B01J 35/45* | (2024.01) | |
| *B01J 35/50* | (2024.01) | |
| *B01J 35/61* | (2024.01) | |
| *B01J 35/70* | (2024.01) | |
| *B01J 35/77* | (2024.01) | |
| *B01J 37/00* | (2006.01) | |
| *B01J 37/02* | (2006.01) | |
| *B01J 37/03* | (2006.01) | |
| *B01J 37/04* | (2006.01) | |
| *B01J 37/06* | (2006.01) | |
| *B01J 37/08* | (2006.01) | |
| *B01J 37/16* | (2006.01) | |
| *C07C 29/141* | (2006.01) | |

(52) U.S. Cl.
CPC ............ *B01J 23/72* (2013.01); *B01J 23/005* (2013.01); *B01J 35/30* (2024.01); *B01J 35/37* (2024.01); *B01J 35/394* (2024.01); *B01J 35/40* (2024.01); *B01J 35/45* (2024.01); *B01J 35/50* (2024.01); *B01J 35/613* (2024.01); *B01J 35/615* (2024.01); *B01J 35/70* (2024.01); *B01J 35/77* (2024.01); *B01J 37/0009* (2013.01); *B01J 37/0236* (2013.01); *B01J 37/031* (2013.01); *B01J 37/04* (2013.01); *B01J 37/06* (2013.01); *B01J 37/088* (2013.01); *B01J 37/16* (2013.01); *C07C 29/141* (2013.01); *B01J 2235/00* (2024.01); *B01J 2235/15* (2024.01)

(58) Field of Classification Search
CPC ........ B01J 23/72; B01J 35/394; B01J 35/615; B01J 35/613; B01J 35/50; B01J 23/005; B01J 37/0009; B01J 37/0236; B01J 37/031; B01J 37/04; B01J 37/06; B01J 37/088; B01J 37/16; C07C 29/141; C01P 2006/12; C01P 2006/21
USPC ........................................ 502/346, 355, 527
See application file for complete search history.

(56) References Cited

U.S. PATENT DOCUMENTS

| | | | |
|---|---|---|---|
| 2,201,235 A * | 5/1940 | Lenth .................. | B01J 23/72 |
| | | | 568/414 |
| 4,308,176 A | 12/1981 | Kristiansen | |
| 4,450,245 A * | 5/1984 | Adair ................... | B01J 23/22 |
| | | | 502/213 |
| 5,008,235 A | 4/1991 | Wegman | |
| 5,403,962 A | 4/1995 | Schneider | |
| 5,763,353 A | 6/1998 | Kadono | |
| 6,455,464 B1 | 9/2002 | Chen | |
| 7,510,591 B2 | 3/2009 | Huber-Dirr | |
| 7,884,046 B2 | 2/2011 | Huber-dirr | |

(Continued)

FOREIGN PATENT DOCUMENTS

| | | |
|---|---|---|
| CN | 1165054 | 11/1997 |
| CN | 1883795 | 12/2006 |

(Continued)

OTHER PUBLICATIONS

English translation of Written Opinion for PCT/EP2021/055910. (Year: 2021).*

*Primary Examiner* — Patricia L. Hailey

(57) ABSTRACT

The present invention relates to an improved catalyst on the basis of a shaped catalyst body for hydrogenating carbonyl groups in organic compounds under the effect of acids and water, characterized in that the shaped catalyst body contains copper in an amount of 17.5 to 34.5 wt. %, relative to the shaped catalyst body and the copper is present in the shaped catalyst body to at least 70% in the form of a copper spinel $CuAl_2O_4$. The invention also relates to the production of the catalyst an to the use of same in the hydrogenation of carbonyl groups in organic compounds in the presence of acids and/or water.

20 Claims, No Drawings

(56) References Cited

U.S. PATENT DOCUMENTS

| | | | |
|---|---|---|---|
| 10,507,456 B2 | 12/2019 | Park | |
| 10,639,616 B2 | 5/2020 | Paulus | |
| 10,744,487 B2 | 8/2020 | Pfanzelt | |
| 2004/0259129 A1 | 12/2004 | Kandel | |
| 2009/0317672 A1* | 12/2009 | Yonemura | C01B 3/16 |
| | | | 502/331 |
| 2013/0123549 A1* | 5/2013 | Zhang | B01J 35/633 |
| | | | 568/864 |
| 2018/0280940 A1 | 10/2018 | Park | |
| 2022/0152596 A1* | 5/2022 | Chen | B01J 35/77 |

FOREIGN PATENT DOCUMENTS

| | | | | |
|---|---|---|---|---|
| CN | 107073457 A | | 8/2017 | |
| CN | 109336162 A | * | 2/2019 | ............ B82Y 40/00 |
| CN | 109745988 | | 5/2019 | |
| CN | 110087767 | | 8/2019 | |
| DE | 4021230 | | 1/1991 | |
| EP | 0434062 A1 | | 6/1991 | |
| EP | 0552463 A1 | | 7/1993 | |
| EP | 0790074 | | 8/1997 | |
| EP | 0974396 A1 | * | 1/2000 | ............ C01G 53/82 |
| EP | 0888185 B1 | * | 9/2012 | ............ B01J 23/755 |
| JP | H11197505 A | * | 7/1999 | ............ B01J 23/70 |
| JP | 2000507155 | | 6/2000 | |
| JP | 2012115771 | | 6/2012 | |
| JP | 2017528313 | | 9/2017 | |
| WO | 2004085356 A1 | | 10/2004 | |
| WO | 2004085456 A1 | | 10/2004 | |

* cited by examiner

CHROMIUM-FREE HYDROGENATION CATALYST HAVING INCREASED WATER AND ACID STABILITY

The present invention relates to an improved catalyst based on a shaped catalyst body for hydrogenation of carbonyl groups in organic compounds, characterized in that the shaped catalyst body comprises a proportion of copper in an amount of 17.5% to 34.5% by weight and in which the copper is present to an extent of at least 70% in the form of a copper spinel $CuAl_2O_4$. The present invention additionally also relates to the preparation of the shaped catalyst body and to the use thereof in the hydrogenation of carbonyl groups in organic compounds.

Catalytic processes for hydrogenating carbonyl groups in organic compounds such as esters, diesters, aldehydes or ketones are of great relevance in industry. Their purposes include conversion of carboxylic acids or their esters, especially esters of fatty acids, into the corresponding alcohols.

Suitable catalysts here are systems based on copper in combination with further transition metal elements. The catalysts are typically in the form of tablets, extrudates or pellets.

WO 2004/085356 describes the preparation of a catalyst for the hydrogenation of carbonyl compounds that comprises, as well as copper and aluminum, at least one oxide of lanthanum, tungsten, molybdenum, titanium or zirconium, and to which has additionally been added copper powder or flakes, cement powder or graphite.

DE 40 21 230 A1 describes a process for preparing alcohols by hydrogenating an organic carboxylic ester compound in the presence of a copper-zirconium catalyst composed of copper, zirconium, and oxygen to afford a corresponding alcohol such as a higher alcohol or dihydric alcohol.

EP 0 434 062 A1 provides a process for hydrogenating a mixture of substances to the corresponding alcohols in which a catalyst is used that is prepared by co-precipitation of metals selected from Mg, Zn, Ti, Zr, Sn, Ni, Co, and mixtures thereof.

The catalyst for the hydrogenation of carbonyl groups in organic compounds that is disclosed in EP 0 552 463 A1 has in its oxidic form the composition $Cu_aAl_bZr_cMn_dO_x$, where a>0; b>0; c>0; d>0; a>b/2; b>a/4; a>c; a>d; and x is the number of oxygen ions required per unit of the formula in order to preserve electroneutrality.

US 2018/0280940 A1 provides for the use of pulverulent catalysts based on $NiAl_2O_4$ or $CuAl_2O_4$ for the hydrogenation of ketones to alcohols. The samples analyzed have copper contents of at least 42.7% by weight.

The catalysts described in U.S. Pat. No. 6,455,464 B1 consist essentially of copper and aluminum and have a spinel content of less than 60% by weight. The catalysts were used in hydrogenolysis.

The starting compounds in the hydrogenation processes generally include traces of acidic compounds. These are for example carboxylic acids present as by-products in esterification reactions. Under the reaction conditions of the hydrogenation reaction, these compounds attack the catalyst and result in a lowering of mechanical stability and sometimes the observation of leaching of the catalytically active metals, which are discharged from the reaction reactor with the product stream and have to be separated therefrom. Moreover, there is also a reduction in the catalytic activity of the catalyst with the progressive discharge of the catalytically active metals.

Catalysts containing copper and chromium are used for such reactions. These typically have enhanced stability to the action of acids. Because of stricter environmental regulations, the use of chromium catalysts is associated with ever higher demands, and so there is a need to replace the existing CuCr systems with environmentally compatible alternatives that nevertheless have comparable catalytic and physical properties.

It was therefore an object of the present invention to provide a catalyst for hydrogenations of carbonyl groups in organic compounds that features improved mechanical stability and that is less susceptible to the action of acidic compounds or water. In addition, it should be possible to use this catalyst particularly in hydrogenations that take place in an acidic and/or aqueous medium.

This object is achieved by the catalyst of the invention.

The invention relates to a Cu—Al shaped catalyst body, characterized in that it contains a proportion of copper within a range from 17.5% to 34.5% by weight based on the total weight of the shaped catalyst body after loss on ignition, and in which the copper is present to an extent of at least 70% in the form of a copper spinel $CuAl_2O_4$.

The shaped catalyst body may be present in various forms, for example in the form of extrudates, spheres, pellets or tablets. In a preferred embodiment, the shaped catalyst body is present in the form of a tablet.

The tableted shaped catalyst body may be present in varying dimensions. The diameter of the tablets may be between 2 and 6 mm and preferably between 3 and 5 mm. The diameter is particularly preferably between 4.4 and 4.6 mm. The height of the tablets may be between 2 and 6 mm and preferably between 2 and 4 mm. The height is particularly preferably between 2.5 and 3.5 mm.

The shaped catalyst body of the invention has a side crush strength of 80 to 300 N, preferably 150 to 250 N, more preferably 170 to 230 N. Preferably, the shaped catalyst body of the invention has a diameter within a range from 3 to 5 mm, a height within a range from 2 to 4 mm, and a side crush strength within a range from 170 to 230 N.

The pore volume, measured by mercury porosimetry, of the shaped catalyst body of the invention is between 100 and 500 $mm^3/g$, preferably between 150 and 400 $mm^3/g$, more preferably between 200 and 400 $mm^3/g$.

The shaped catalyst body of the invention has a specific BET surface area of 20 to 150 $m^2/g$, preferably of 70 to 120 $m^2/g$.

The amounts of copper and aluminum in the shaped catalyst body of the invention that are stated below relate to an oxidic, non-reduced form of the shaped catalyst body in which the elements are present in oxidized form as Cu(II) and Al(III).

In one embodiment, the shaped catalyst body in oxidic form comprises Cu in an amount within a range from 22.1% by weight, preferably 24.5% by weight, further preferably 25.0% by weight, more preferably 24.5% by weight, more preferably 25.0% by weight, even more preferably 27.0% by weight, most preferably 27.5% by weight, to 33.8% by weight, preferably 31.0% by weight, more preferably 30.4% by weight, based on the total weight of the shaped catalyst body after loss on ignition.

In another embodiment, the shaped catalyst body in oxidic form comprises Al in an amount within a range from 21.2% by weight, preferably 21.8% by weight, more preferably 24.9% by weight, more preferably 29.0% by weight, even more preferably 29.5% by weight, most preferably 30.1% by weight, and 38.3% by weight, preferably 36.9% by weight, more preferably 36.7% by weight, more preferably 36.4% by weight, particularly preferably 35.1% by weight, most preferably 34.7% by weight, based on the total weight of the shaped catalyst body after loss on ignition.

At least 70% of the copper present in the shaped catalyst body is in the form of a copper spinel $CuAl_2O_4$. In a preferred embodiment, the proportion is within a range from 70 to 98%, more preferably within a range from 70 to 95%, even more preferably within a range from 75 to 90%, most preferably within a range from 80 to 90%.

In one embodiment, the $Cu/Al_2$ atomic ratio is less than 1, preferably less than 0.97, more preferably less than 0.94. In another embodiment, the $Cu/Al_2$ atomic ratio is greater than 0.49 and less than 1, preferably greater than 0.57 and less than 0.97, more preferably greater than 0.58 and less than 0.94, particularly preferably greater than 0.79 and less than 0.94.

In one embodiment, the catalyst does not contain manganese and zirconium in oxidized or metallic form. In another embodiment, the catalyst aside from copper does not contain any further transition metal in oxidized or metallic form.

The shaped catalyst body of the invention is prepared by the following steps according to the invention:
 a) combining (i) an aqueous solution A of copper compounds and optionally transition metal compounds and (ii) an aqueous alkaline solution B to form a precipitate, wherein solution A and/or solution B additionally comprises a dissolved aluminum compound,
 b) separating off the precipitate, optionally washing the precipitate,
 c) drying the precipitate to obtain a dried precipitate,
 d) calcining the dried precipitate from step c) at a temperature of between 200 and 800° C. for a period of between 30 min and 4 h.
 e) shaping the calcined precipitate from step d) to obtain a shaped body.

Suitable starting compounds for the compounds of copper, aluminum, and any transition metal that are employed in step a) are in principle all compounds that are soluble in water or in basic or acidic aqueous solutions. Preference is given to using carbonates, nitrates, halides, oxides, sulfates, acetates or formates.

The aluminum compound here may either already be present in the copper-containing solution A or it may be added together with the precipitant in the form of the aqueous alkaline solution B.

The proportion of the copper compound in solution A in step a) is chosen such that the proportion of copper in the final catalyst is within a range from 17.5% to 34.5% by weight based on the total weight of the shaped catalyst body after loss on ignition.

In one embodiment, the precipitate in step a) is formed by passing the aqueous alkaline solution B comprising the precipitant into solution A comprising the dissolved compound of copper and of any transition metal, preferably with constant stirring of the metal-containing solution.

In another embodiment, the precipitate in step a) is formed by passing the aqueous alkaline solution B comprising the precipitant and the aluminum compound into solution A comprising the dissolved compound of copper and of any transition metal, preferably with constant stirring of the metal-containing solution.

In another embodiment, the aqueous alkaline solution B comprising the precipitant is passed into a common precipitation vessel together with the metal-containing solution A.

The temperature of the combined solutions in step a) is usually within a range from 10 to 90° C., preferably within a range from 30 to 90° C., more preferably within a range from 50 to 85° C.

The pH during the precipitation of the metal-containing compounds in step a) is within a range from 6.0 to 8.0, preferably within a range from 6.5 to 7.5, more preferably within a range from 6.5 to 7.0.

After the precipitation, the resulting precipitate is separated off. This is typically done by filtration. Alternatively, the precipitate can also be separated off by decanting or centrifuging.

The separated precipitate can then optionally be subjected to one or more washing steps in order to remove any adhering impurities such as excess hydroxide ions or alkali metal ions. The precipitate here can either remain directly in the filter chamber in the form of a filter cake and have a wash medium, preferably deionized water, passed through it, or it can alternatively be slurried in the wash medium and separated off again by means of a filter press, decantation or centrifugation. This process is usually repeated until the conductivity of the wash medium falls below a certain value. This is typically 0.5 mS/cm, in particular 0.3 mS/cm. The conductivity is determined in accordance with DIN 38404, part 8.

After it has been separated off and optionally washed, the precipitate is dried at a temperature within a range from 50 to 150° C., preferably within a range from 70 to 130° C., more preferably within a range from 80 to 120° C. The drying can take place in a spray dryer. Alternatively, the drying can also take place in a stationary oven, in which case the drying time is usually within a range from 30 minutes to 6 h.

The dried powder is then subjected to calcination. This takes place at a temperature of between 200 and 800° C., preferably between 400 and 800° C., more preferably between 600 and 750° C. The duration of the calcination is between 30 min and 4 h, preferably between 1 and 3 h, and more preferably between 1.5 and 2.5 h.

The dried and calcined precipitate is then subjected to a shaping process.

Customary shaping processes are tableting, extrusion, and pelletization. In a preferred embodiment, the calcined precipitate is tableted.

Tableting is usually carried out with a tablet press such as a Kilian Pressima press. The tableting is preferably carried out with addition of lubricants such as graphite, oils or stearates, preferably graphite. For this purpose, the calcined precipitate obtained in step d) is mixed with at least one lubricant, optionally compacted and/or granulated, and then tableted. The proportion of lubricant in the mixture is usually between 0.5% and 5.0% by weight, preferably between 1% and 4% by weight, based on the total weight of the composition to be tableted.

In one embodiment, a binder is added to the precipitate to be shaped. In principle, all compounds that increase the mechanical stability of the shaped body are suitable as binders. Suitable binders are aluminum oxide, such as pseudoboehmite, boehmite or corundum, silica, calcium aluminate, calcium silicate or clay minerals such as bentonite.

The binder is usually added to the mixture in such an amount that the content of binder in the shaped body is within a range from 2% to 30% by weight, preferably within a range from 2% to 10% by weight, and more preferably within a range from 2% to 5% by weight, based on the total weight of the shaped body after loss on ignition.

The shaped bodies obtained in step e) can then additionally be subjected to a thermal treatment in a step f). This is carried out at a temperature of between 200 and 800° C., preferably between 400 and 700° C., more preferably between 400 and 600° C. The duration of this thermal treatment is between 30 min and 4 h, preferably between 1 and 3 h, and more preferably between 1.5 and 2.5 h.

The shaped catalyst body obtainable by the process of the invention may be reduced in a further step before it is used in the catalytic reaction.

The reduction is preferably effected by heating the shaped catalyst body in a reducing atmosphere. The reducing atmosphere is especially hydrogen. The reduction is carried out for example at a temperature within a range from 150° C. to 450° C., preferably within a range from 160° C. to 250° C., more preferably within a range from 170° C. to 200° C. The reduction is carried out for example over a period of 1 hour to 20 days, preferably over a period of 2 hours to 120 hours, more preferably over a period of 24 to 48 hours. In a preferred embodiment, the reduction is carried out at a temperature within a range from 190° C. to 210° C. over a period of 24 to 48 hours.

In a preferred embodiment, the shaped catalyst bodies are stabilized in wet or dry form after the reduction. In the case of wet stabilization, the shaped catalyst bodies are blanketed with a liquid in order to minimize contact with oxygen. Suitable liquids include organic liquids and water, preferably organic liquids. Preferred organic liquids are those having a vapor pressure at 20° C. of 0.5 hPa or less. Examples of such suitable organic liquids are isodecanol, Nafol, fatty alcohols, hexadecane, 2-ethylhexanol, propylene glycol, and mixtures thereof, particularly isodecanol. In the case of dry stabilization, a mixture of oxygen or an oxygen-containing gas, preferably air, and an inert gas such as argon or nitrogen is metered into the reduction space. The concentration of oxygen in the mixture is preferably increased from about 0.04% by volume to about 21% by volume. For example, a mixture of air and inert gas can be metered in, wherein the ratio of air to inert gas is initially about 0.2% by volume air to 99.8% by volume inert gas. The ratio of air to inert gas is then increased gradually (for example continuously or stepwise) until ultimately, for example, 100% by volume air is being metered in (corresponding to an oxygen concentration of about 21% by volume). Without being bound to any particular theory, it is assumed that the metered addition of air or oxygen gives rise at the surface of the catalyst to a thin oxide layer having a thickness of, for example, 0.5 to 50 nm, preferably 1 to 20 nm, more preferably 1 to 10 nm, which protects the shaped catalyst body from further oxidation. In the case of dry stabilization, the reactor temperature is preferably 100° C. or less, more preferably ° C. to 70° C., and most preferably 30° C. to 50° C. The reduction can be carried out ex situ or in situ in the reaction system into which the shaped catalyst body is introduced as catalyst.

In one embodiment, the crystallite size of the copper in the reduced shaped body is within a range from 7 to 12 nm, preferably within a range from 8 to 11 nm, more preferably within a range from 9 to 11 nm.

The side crush strength of the shaped catalyst bodies in tablet form after reduction has values from 50 to 250 N, preferably from 60 to 200 N, more preferably from 70 to 150 N.

After the reduction, the shaped catalyst bodies of the invention or the shaped catalyst bodies obtainable by the process of the invention contain Cu(0) (i.e. copper in oxidation state 0), especially in a proportion from 5% to 36% by weight, preferably in a proportion from 10% to 34% by weight, more preferably in a proportion from 20% to 32% by weight, based on the total weight of the reduced catalyst after loss on ignition.

The catalysts of the invention have improved stability to acidic media or water-containing media, such as organic solutions or organic gaseous mixtures containing acids and/or water as impurities. In addition to an improved side crush strength of the shaped catalyst bodies, this is manifested by a reduced loss of copper ions, which are critical to the catalytic activity, from the material. In addition, the shaped catalyst body of the invention also has a lower overall loss of metal ions, which is a sign of increased stability of the solid-state structure in respect of leaching of individual metal ions.

To determine the stability of the shaped catalyst bodies of the invention to the action of acids, the shaped bodies are subjected to treatment in an acid- and water-containing medium, after which the side crush strength of the shaped bodies thus treated and the proportion of metal ions in the acid- and water-containing medium are determined.

The present invention further provides for the use of the catalyst of the invention in catalytic hydrogenations of carbonyl groups in organic compounds, which takes place in an acid- and/or water-containing medium. Possible reactions include the hydrogenation of aldehydes to alcohols, especially of oxo aldehydes to oxo alcohols, the hydrogenation of a fatty acid, for example through esterification, especially to fatty acid methyl esters, and subsequent hydrogenolysis, or the hydrogenation of ketones to the corresponding alcohols.

Typical acid values of the reaction media used here are within a range from 0.1 to 3.4 $mg_{KOH}/g_{solution}$, preferably within a range from 0.2 to 1.0 $mg_{KOH}/g_{solution}$. The acid value is a measure of the presence of acidic OH groups, for example in carboxylic acids, in a solution and can be determined for example by titrating a corresponding solution with a KOH solution to the neutralization point. The amount of KOH consumed here, based on the weight of the solution, corresponds to the acid value, expressed in $mg_{KOH}/g_{solution}$.

The water content in such reaction media is usually within a range from 0.1% to 5.0% by weight, more preferably within a range from 0.2% to 5.0% by weight, particularly preferably within a range from 0.5% to 3.0% by weight.

The fatty acids to be hydrogenated in the context of the present invention are saturated or unsaturated fatty acids, which are classified according to chain length into short-chain (up to 6-8 carbon atoms), medium-chain (6-8 to 12 carbon atoms), and long-chain (13 to 21 carbon atoms) fatty acids. In addition, fatty acids having more than 22 carbon atoms can also be used.

EXAMPLES

The loss on ignition in the context of the present invention was determined in accordance with DIN 51081 by determining the weight of about 1-2 g of a sample of the material to be analyzed and then heating it to 900° C. under ambient atmosphere and storing it at this temperature for 3 h. The sample was then cooled under an inert atmosphere and the residual weight measured. The difference in weight before and after thermal treatment corresponds to the loss on ignition.

The side crush strength (SCS) was determined in accordance with ASTM 04179-01 without predrying the tablets. This was done by measuring a statistically sufficient number of tablets (at least 20 tablets) and calculating the arithmetic mean of the individual measurements. This average corresponds to the side crush strength of a particular sample.

Chemical elements were determined by ICP (inductively coupled plasma) measurement in accordance with DIN EN ISO 11885.

The acid value was determined by mixing about 4 g of the sample solution with 25 mL of propanol and adding phenolphthalein as indicator. The solution was titrated at room temperature with a tetrabutylammonium hydroxide solution (0.1 mol/L in 2-propanol/methanol) until the color change. The acid value AV in $mg_{KOH}/g_{solution}$ is calculated according to $$AV = \frac{\text{Volume consumed} * c * M}{\text{Sample weight}} = mg\ KOH/g\ \text{sample}$$

where AV=acid value, volume consumed=volume of tetrabutylammonium hydroxide solution consumed in mL, c=concentration of the tetrabutylammonium hydroxide solution, M=molar mass of KOH, and sample weight=amount of the sample solution used in g.

Specific BET surface areas were determined by nitrogen adsorption in accordance with DIN 66131.

The pore volume of the shaped catalyst body was measured by the mercury porosimetry method in accordance with DIN 66133 in a pressure range from 1 to 2000 bar.

The proportion by weight of copper spinel $CuAl_2O_4$ in the shaped catalyst body and the crystallite size of the copper were determined by X-ray diffractometry and Rietveld refinement.

This was done by analyzing the sample in a Bruker D4 Endeavor over a range from 5 to 90° 2Θ (step sequence 0.020° 2Θ, 1.5 seconds measurement time per step). The radiation used was CuKα1 radiation (wavelength 1.54060 Å, 40 kV, 35 mA). During the measurement, the sample stage was rotated about its axis at a speed of 30 revolutions/min. The resulting diffractogram of the reflection intensities was quantitatively calculated by means of Rietveld refinement and the proportion of copper spinel $CuAl_2O_4$ in the sample was determined. The proportion of the respective crystal phases was determined using the TOPAS software, version 6, from Bruker. The crystallite size of the copper was calculated by the software using the Scherrer formula on the basis of the reflection at 43.3°2Θ.

Example 1: Preparation of the Reference Powder

An aqueous solution 1 was prepared by adding 4482 g of $Cu(NO_3)_2·2.5H_2O$ to 3000 mL of demineralized water. The mixture was then mixed with 3000 mL of nitric acid (65% by weight $HNO_3$). The acidic solution was made up to a total volume of 23 300 mL with demineralized water. The pH of the solution was −0.20. The solution was then heated to 80° C.

In addition, 1600 g of $Na_2CO_3$ and 4625 g of $NaAlO_2$ were dissolved in 26 670 mL of demineralized water; the pH of the solution was 12.43.

For the precipitation, a precipitation vessel was provided, which was filled with 8000 mL of demineralized water. Into this were introduced simultaneously the copper-containing solution and the carbonate-containing solution. The dosing rate was adjusted such that the precipitation solution had a pH of approx. 6.5.

At the end of the addition and after precipitation was complete, the precipitate was filtered off and washed with demineralized water to remove adhering impurities. The filter cake was then resuspended in 8000 mL of demineralized water and dried.

The spray-dried powder was then calcined at 750° C. for 2 h.

The relative proportions by weight were Cu=30% by weight and Al=30% by weight, based on the total mass after loss on ignition.

Example 2: Preparation of Inventive Catalyst 1

1529 g of the calcined powder obtained in example 1 was combined with 36 g of Pural SCF binder, 5 g of demineralized water, and 31 g of graphite and mixed for 10 minutes to afford a homogeneous mixture. This mixture was first compacted and granulated and then pressed in a Kilian Pressima tablet press into tablets having a width of 4.5 mm and a height of 3 mm. The tablets were then finally subjected to calcination at 450° C. for 2 h. The bulk density of the tablets thus obtained was 1111 g/l, the side crush strength of the tablets was 198 N. 84% of the copper present in the shaped catalyst body was in the form of copper spinel $CuAl_2O_4$. The crystallite size of the copper in the shaped body after reduction was 9.5 nm. The pore volume was 314 $mm^3/g$, the BET specific surface area was 103 $m^2/g$.

Example 3: Preparation of Inventive Catalyst 2

For the preparation of inventive catalyst 2, 360 g of the calcined powder obtained in example 1 was combined with 7.2 g of graphite and mixed for 10 minutes, affording a homogeneous mixture. This mixture was first compacted and granulated and then pressed in a Kilian Pressima tablet press into tablets having a width of 4.5 mm and a height of 3 mm. The tablets were then finally subjected to calcination at 450° C. for 2 h. The side crush strength of the tablets was 155 N.

Comparative Example 1 (Catalyst A)

Catalyst A was prepared by precipitating a copper- and chromium-containing precipitate, converting it into the oxidic form by thermal treatment, and pressing it into tablets having a width of 4.5 mm and a height of 3 mm. The relative proportions by weight were Cu=37.5% by weight and Cr=23.0% by weight, based on the total mass after loss on ignition.

Comparative Example 2 (Catalyst B)

To prepare catalyst B, an aqueous solution 1 was prepared by dissolving 1250 g of $Cu(NO_3)_2·3H_2O$, 220 g of Mn $(NO_3)_2·4H_2O$, and 1800 g of $Al(NO_3)_3·9H_2O$ in 9000 g of distilled $H_2O$. Solution 2 was prepared by dissolving 1720 g of $Na_2CO_3$ in 7500 g of distilled $H_2O$. The two solutions were heated separately to 80° C. while stirring. The two solutions were then metered into a precipitation vessel with continuous stirring. The resulting precipitate was filtered off and washed with distilled $H_2O$ to remove adhering impurities until the wash water had a conductivity below 0.25 mS. The filter cake was then dried. The dried powder was then subjected to thermal treatment at 750° C. for 3 h; the relative proportions by weight in the tablets were Cu=44.8% by weight, Mn=7.0% by weight, and Al=17.92% by weight, based on the total mass after loss on ignition.

1706 g of this powder was combined with 51 g of Secar 71 binder, 5 g of demineralized water, and 34 g of graphite and mixed for 10 minutes to afford a homogeneous mixture. This mixture was first compacted and granulated and then pressed in a Kilian Pressima tablet press into tablets having a width of 4.5 mm and a height of 3 mm. The tablets were then finally subjected to calcination at 600° C. for 2 h. The relative proportions by weight in the tablets were Cu=43.5% by weight, Zr=6.8% by weight, Al=18.5% by weight, and Ca=0.6% by weight, based on the total mass after loss on ignition.

Comparative Example 3 (Catalyst C)

The powder for catalyst C was prepared in accordance with the method for preparing the powder for catalyst B, except that the proportion of $Mn(NO_3)_2 \cdot 4H_2O$ was chosen such that the relative proportion by weight of manganese in the powder thus obtained, based on the mass after loss on ignition, was 0.1% by weight. The relative proportions by weight were Cu=49.7% by weight, Mn=0.1% by weight, and Al=20.0% by weight, based on the total mass after loss on ignition. 1706 g of the powder thus obtained was combined with 5 g of demineralized water and 34 g of graphite and mixed for 10 minutes to afford a homogeneous mixture. This mixture was first compacted and granulated and then pressed in a Kilian Pressima tablet press into tablets having a width of 4.5 mm and a height of 3 mm. The relative proportions by weight in the tablets were Cu=49.7% by weight, Mn=0.1% by weight, and Al=20.0% by weight, based on the total mass after loss on ignition. The bulk density of the tablets thus obtained was 1152 g/L.

A portion of the material obtained after tableting of comparative catalysts A, B, and C and of inventive catalyst 1 was subjected to a reduction. This was done by subjecting the sample to thermal treatment in a gas mixture of 2% by volume $H_2$ and 98% by volume $N_2$ at a temperature of 200° C. in order to bring about reduction of the Cu present in the oxidic state. The sample then was cooled to room temperature under nitrogen and stored under liquid isodecanol. The side crush strength of this sample was then measured and used for use examples 1 to 3.

Use Example 1: Stability Test

For the inventive catalyst 1 and the comparative catalysts A, B and C, the acid stability was in each case determined by combining a quantity of tableted, reduced, and stabilized samples totaling 25 g with a liquid mixture composed of 75 g of an oxo aldehyde solution, a water content of 1% by weight, and an acid value of 0.2 $mg_{KOH}/g_{solution}$. This mixture was heated at 120° C. under a nitrogen atmosphere for 4 days. The tableted sample was separated from the liquid mixture at the end of the test. Its side crush strength was then immediately measured.

After performance of the test, the oxo aldehyde solution was analyzed for the presence of Cu, Al, Cr, and Mn.

TABLE 1

| Example | Side crush strength after reduction [N] | Side crush strength after acid/water treatment [N] |
|---|---|---|
| Catalyst 1 | 137 | 119 |
| Comparative catalyst A | 97 | 86 |
| Comparative catalyst B | 93 | 74 |
| Comparative catalyst C | 47 | not measurable, because the sample material had fractured |

Table 1 shows clearly that the side crush strength of the inventive catalyst after reduction is already higher than that of the catalysts known from the prior art. The increased stability to acid and water is demonstrated even more clearly by the side crush strength values at the end of the test. The inventive catalyst still has the highest value for side crush strength here, whereas by contrast the tablets of the chromium-free CuAlMn catalyst fractured during the test and no meaningful measurement of the side crush strength was possible.

TABLE 2

| | Concentration of metals in test solution after test [ppm] | | | |
|---|---|---|---|---|
| Example | Cu | Al | Cr | Mn |
| Catalyst 1 | 8 | 29 | — | — |
| Comparative catalyst A | 12 | — | 70 | — |
| Comparative catalyst B | 64 | 43 | — | 5510 |
| Comparative catalyst C | 69 | 116 | — | 31 |

The data from Table 2 show that the inventive catalyst is largely stable to a loss of copper species under the severe test conditions, whereas this is markedly higher for the comparative catalysts. Overall, the catalyst of the invention has a low total loss of metals compared to the comparative catalysts.

Use Example 2: Hydrogenation of Oxo Aldehydes to Oxo Alcohols

A bed with a volume of 100 mL of inventive catalyst 1 in the reduced and wet-stabilized form was introduced into a reactor and heated under a stream of nitrogen to temperatures within a range from 120 to 180° C., with a reaction time of 2 days chosen for each temperature. A liquid phase containing 45% by weight of aldehyde, 25% by weight of the corresponding alcohol, and 30% by weight of by-products (paraffins, olefins, others), having a water content of 0.7% by weight and an acid value of 0.2 was then passed through the reactor.

The constituents of the product stream downstream of the reactor were analyzed by gas chromatography. The conversions and alcohol contents in the product stream calculated over the entire run time at the respective temperature are shown in Table 3.

For comparison, a sample of comparative catalyst A and a sample of comparative catalyst B were subjected to the same conditions and the results obtained are likewise shown in Table 3.

TABLE 3

| | Aldehyde conversion [% by weight] | | | Alcohol fraction in the product stream [% by weight] | | |
|---|---|---|---|---|---|---|
| Example | 120° C. | 140° C. | 180° C. | 120° C. | 140° C. | 180° C. |
| Catalyst 1 | 91.8 | 95.2 | 96.1 | 65.2 | 66.1 | 65.7 |
| Comparative catalyst A | 95.6 | 96.0 | 98.2 | 68.0 | 66.2 | 65.5 |
| Comparative catalyst B | 92.5 | 96.3 | 97.5 | 69.3 | 71.1 | 70.2 |

It is clear from Table 3 that inventive catalyst 1 achieves aldehyde conversions under comparable test conditions that correspond roughly to those of the commercial chromium-containing catalyst A. Similar behavior is also demonstrated for the formation of the corresponding alcohol. The catalyst of the invention is thus an environmentally friendly alternative to the chromium-containing catalysts used up to now.

The data additionally show that, although comparative catalyst B achieves comparable conversions and even significantly improved alcohol formation, its low physical stability makes it unsuitable for use over a prolonged period of time under the severe conditions of the reaction.

The invention claimed is:

1. A Cu—Al shaped catalyst body, wherein
the shaped catalyst body contains copper in a proportion by weight from 17.5% to 34.5% and Al in a proportion by weight from 24.9% to 36.7%, each based on the total weight of the shaped catalyst body after loss on ignition,
the $Cu/Al_2$ atomic ratio is greater than 0.57 and less than 0.97, and
the copper is present in the form of a copper spinel $CuAl_2O_4$ to an extent of at least 70%.

2. The shaped catalyst body as claimed in claim 1, wherein the copper is present in a proportion by weight from 25.0% to 34.5%, based on the total weight of the shaped catalyst body after loss on ignition.

3. The shaped catalyst body as claimed in claim 1, wherein the shaped catalyst body is in tablet form.

4. The shaped catalyst body as claimed in claim 1, wherein the side crush strength is 150 to 250 N.

5. The shaped catalyst body as claimed in claim 1, which contains Al in an amount within a range from 29.0% by weight to 36.4% by weight based on the total weight of the shaped catalyst body after loss on ignition.

6. The shaped catalyst body as claimed in claim 1, wherein the $Cu/Al_2$ atomic ratio is greater than 0.79 and less than 0.94.

7. The shaped catalyst body as claimed in claim 1, wherein the side crush strength is within a range from 170 to 230 N.

8. The shaped catalyst body as claimed in claim 1, wherein the specific BET surface area is within a range from 20 to 150 $m^2/g$.

9. A process for preparing a shaped catalyst body as claimed in claim 1, comprising the following steps:
a) combining (i) at least one aqueous solution A of a copper compound and a first aluminum compound, and (ii) at least one aqueous alkaline solution B to form a precipitate, wherein solution B additionally comprises a dissolved second aluminum compound,
b) separating off the precipitate,
c) drying the precipitate to obtain a dried precipitate,
d) calcining the dried precipitate from step c) at a temperature of between 20° and 800° C. for a period of between 30 min and 4 h,
e) shaping the calcined precipitate from step d) to obtain a shaped body.

10. The process as claimed in claim 9, wherein the shaped body obtained from step e) is subjected in a step f) to thermal treatment at a temperature of between 20° and 800° C. for a period of between 30 min and 4 h.

11. The process as claimed in claim 9, wherein the shaping in step e) is carried out with a binder.

12. The process as claimed in claim 9, wherein step f) is followed by reduction of the shaped body.

13. A process for hydrogenating carbonyl groups in an organic compound, the process comprising contacting the organic compound with hydrogen in the presence of the shaped catalyst body as claimed in claim 1.

14. The process as claimed in claim 13, wherein the compound is an oxo aldehyde, and the hydrogenation of the compound provides an oxo alcohol.

15. The shaped catalyst body as claimed in claim 1, that is essentially free of manganese and zirconium.

16. The shaped catalyst body as claimed in claim 1, wherein copper is present in the form of a copper spinel $CuAl_2O_4$ to an extent within the range of 75-90%.

17. The shaped catalyst body as claimed in claim 1, wherein the copper is present in a proportion by weight from 27.5% to 31%, based on the total weight of the shaped catalyst body after loss on ignition.

18. The shaped catalyst body as claimed in claim 1, wherein
the copper is present in a proportion by weight from 25.0% to 34.5%, based on the total weight of the shaped catalyst body after loss on ignition;
copper is present in the form of a copper spinel $CuAl_2O_4$ to an extent of at least 80%;
the $Cu/Al_2$ atomic ratio is greater than 0.58 and less than 0.94;
Al is present in an amount within a range from 29.0% to 36.4%, based on the total weight of the shaped catalyst body after loss on ignition;
the side crush strength is 150 to 250 N
the specific BET surface area is within a range from 20 to 150 $m^2/g$.

19. The shaped catalyst body as claimed in claim 18, essentially free of manganese and zirconium.

20. The shaped catalyst body as claimed in claim 19, wherein the $Cu/Al_2$ atomic ratio is greater than 0.79 and less than 0.94.

* * * * *